(12) United States Patent
Fernando et al.

(10) Patent No.: US 6,363,435 B1
(45) Date of Patent: Mar. 26, 2002

(54) EVENT SOURCING AND FILTERING FOR TRANSIENT OBJECTS IN A HIERARCHICAL OBJECT MODEL

(75) Inventors: Joseph P. Fernando, Woodinville; John M. Norwood, Redmond, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/017,988

(22) Filed: Feb. 3, 1998

(51) Int. Cl.[7] .............................. G06F 9/54; G06F 11/30
(52) U.S. Cl. ........................................ 709/318; 709/315
(58) Field of Search .......................................... 709/315

(56) References Cited

U.S. PATENT DOCUMENTS

| | | | | |
|---|---|---|---|---|
| 5,485,617 A | * | 1/1996 | Stutz et al. | 395/700 |
| 5,487,141 A | * | 1/1996 | Cain et al. | 395/135 |
| 5,517,655 A | * | 5/1996 | Collins et al. | 395/800 |
| 5,991,536 A | * | 11/1999 | Brodsky et al. | 395/704 |
| 6,014,138 A | * | 1/2000 | Cain et al. | 345/335 |

* cited by examiner

Primary Examiner—Alvin Oberley
Assistant Examiner—Lewis A. Bullock, Jr.
(74) Attorney, Agent, or Firm—Woodcock Washburn LLP

(57) ABSTRACT

A single object functions as a centralized monitoring point for events fired in a hierarchical object model. Objects within the hierarchy register with the event monitoring object when they are created. These objects then route their events to the event monitoring object. A listening object also registers with the event monitoring object to receive notification upon the occurrence of certain events within the hierarchy. A property of the event monitoring object corresponding to a particular class of object is parameterized with an identifier that designates the events to be sourced to the listening object The event monitoring object couples the listening object to a filter object that sources only events designated by the parameterized property. The event monitoring creates the filter objects as needed. A filter object can report events to more than one listening object if the listening objects register to be notified of the same events.

29 Claims, 5 Drawing Sheets

EVENT SOURCING AND FILTERING FOR TRANSIENT OBJECTS IN A HIERARCHICAL OBJECT MODEL

FIELD OF THE INVENTION

This invention relates generally to object-oriented programming, and more particularly to hierarchical object models.

BACKGROUND OF THE INVENTION

Object-oriented programming (OOP) languages are rapidly replacing procedure-oriented programming languages which were prevalent in the early 1970's. An object is an encapsulated module of code and related data which is externally accessible through well-defined and controlled connection points, known as the object's methods and properties. The values of an object's data defines the object's "state." Another object can determine the first object's state and optionally modify that state by specifying the first object's methods and properties in a message directed to the first object. A collection of objects is created to perform the functions a programmer wants to include in a computer application. The OOP paradigm commonly supports the collection as a hierarchy of interconnected objects in a parent-child tree model. The programmer constructs the hierarchy so that each object in the hierarchy is logically connected to other objects from which it needs to receive messages As long as the program is based on a set of actions performed in a predefined sequence, the hierarchical object model and messaging in a standard OOP system works well.

However, in interactive operating systems, such as Microsoft Windows, a user controls the sequence of program execution by choosing actions to be performed in a relatively random fashion. Each choice creates an event that the application must process. The original property/method paradigm only permitted an object to process incoming messages, but interactive operating systems require that the object also output "events" in response to the user's actions. Various extensions to the basic OOP paradigm have been implemented to handle events, but all require additional interconnections among the objects in the hierarchy to receive events from other objects. Such additional interconnections increase the complexity of the model.

Whenever a child object is created or removed from the hierarchy, its parent object "fires" or "sources" an event that notifies other objects of the creation or removal of the child object. In a hierarchical object model in which entire branches of objects can be transient, connecting and receiving events from other objects becomes extremely cumbersome and problematic due to the large amount of overhead associated with tracking the transient objects. When the hierarchy structure extends to great depths and most of the objects in the hierarchy are transient, an object or program that needs to detect the creation and removal of an object far down in the hierarchy must "listen" for events from all the objects above the target object in which it is interested to determine when a new branch containing the target object is created or destroyed. Thus, the listening object must track the creation and removal of all objects above the target object.

One approach used to ease the overhead burden of following all events from all parent objects of the target object is "event bubbling" in which each object "re-fires" or "bubbles up" to its parent object each event it receives from its children objects. The listening object now listens on the target's highest parent object. However, event bubbling merely redistributes the overhead burden among the objects in the hierarchy without reducing the overall costs of tracking each transient object. No attempt is made by the parent object to determine what events may be of interest to the listening object so the parent object broadcasts all events in an unorganized fashion. Furthermore, adding new events to an object in a hierarchy under the event bubbling scheme perturbs the established event structure and introduces compatibility issues.

An additional problem arises when listening for transient objects in a hierarchical model. When the lower object terminates, all the connections between itself and the other objects in the hierarchy must be completely removed, introducing additional overhead costs into the system. If the connection between the lower object and a higher object is not "torn-down," the higher object cannot terminate when necessary, leaving "ghost" objects in the hierarchy. This problem is particularly acute when using the event bubbling scheme described above because of all the connection required to support the re-firing of events up the hierarchy.

Therefore, a method is needed that permits interested objects to listen for events occurring in a hierarchical object model that pertain to certain objects. The interested objects should receive notification of such events in an organized fashion. The method should also decrease the overhead associated with current event-driven object-oriented programs.

SUMMARY OF THE INVENTION

The above-mentioned shortcomings, disadvantages and problems are addressed by the present invention, which will be understood by reading and studying the following specification A computerized method is described that centralizes the receiving and sourcing of events occurring in a hierarchical object model. The method creates a monitoring object, logically coupled to an object in the hierarchy, to which the events in the hierarchy are routed. The monitoring object has a plurality of properties, or accessor functions, each of which corresponds to the events that pertain to a class of objects in the hierarchy and has a parameter for designating an object in the class. A listener objects or a process on behalf of the listener object, causes the initiation of a notification request. The notification request is initiated by calling the property corresponding to the class of the target object, the property having been parameterized with an identifier for the target object. When the method receives the notification request, it determines if a filter object characterized by the parameterized property in the request has been created and creates the filter object if it does not exist. The appropriate filter object is logically coupled between the monitoring object and the listener object. Events pertaining to the target object as designated by the parameterized property are transmitted from the monitoring object to the filter object for sourcing to the listener object.

If a second notification request is received that specifies the same property with the same parameterization as in the first request, the method logically couples the same filter object to a listener object that caused the initiation of the second notification request or on whose behalf the notification request was initiated. Otherwise, the method creates a filter object characterized by the parameterized property in the second notification request and couples it to the listener object that caused the initiation of the second notification request or on whose behalf the notification request was initiated.

An event received by the event monitoring object for which there is no corresponding filter objects is discarded. Optionally, a filter object is not destroyed when all the listener objects to which the filter object is coupled terminate. The identifier can designate a unique object, objects in a class that occupy a certain level of the hierarchy, or all objects in a class regardless of their level. "Alternatively, the event monitoring object creates a event filter object without receiving a notification request."

In another aspect of the invention, a hierarchical object model for an object-oriented program is described which contains a plurality of program objects logically coupled together in a hierarchical relationship. The model also contains an event monitoring object and plurality of event filter objects. The plurality of program objects fire events during execution of the program. The event monitoring object is logically coupled to an object in the hierarchical object model and serves as a routing destination for the events. The plurality of event filter objects are logically coupled to the event monitoring object. Each event filter object is created by the event monitoring object to source events pertning to an instance of a program object as determined by a corresponding parameterized property. A listener object is logically coupled to the appropriate event filter object based on the parameterized property in a notification request received by the event monitoring object.

An event sourcing and filtering program executed from a computer-readable medium by a processing unit in a computer system to create the above described hierarchical object model is also disclosed.

The present invention reduces the overhead burden in a hierarchical object model by creating an event monitoring object to which all events are directed, alleviating the redundancy of re-firing events up the hierarchy and eliminating the need to "tear down" complicated connections between objects. Because the event monitoring object and the filter objects source to the listener objects only those object-related events in which the listener objects are interested, the listener objects do not have to sift through unorganized broadcasts of events from all objects to find the ones they need. Furthermore, the event monitoring object can be tailored to receive only a subset of all fired events depending on the nature of the hierarchical object model. The present invention simplifies the programming of applications using a hierarchical object model and increases the performance of such applications.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical mechanical, electrical and other changes may be made without departing from the spirit or scope of the present invention. The following detailed description is, therefore, not to be taken in a limiting sense, and the scope of the present invention is defined only by the appended claims.

The dead description is divided into five sections. In the first section, the hardware and the operating environment in conjunction with which embodiments of the invention may be practiced are described. In the second section, an overview of the invention is presented. In the third section, methods for an exemplary embodiment of the invention are provided In the fourth section, a particular Visual Basic implementation of the invention is described. Finally, in the fifth section, a conclusion of the detailed description is provided.

HARDWARE AND OPERATING ENVIRONMENT

Figure 1:
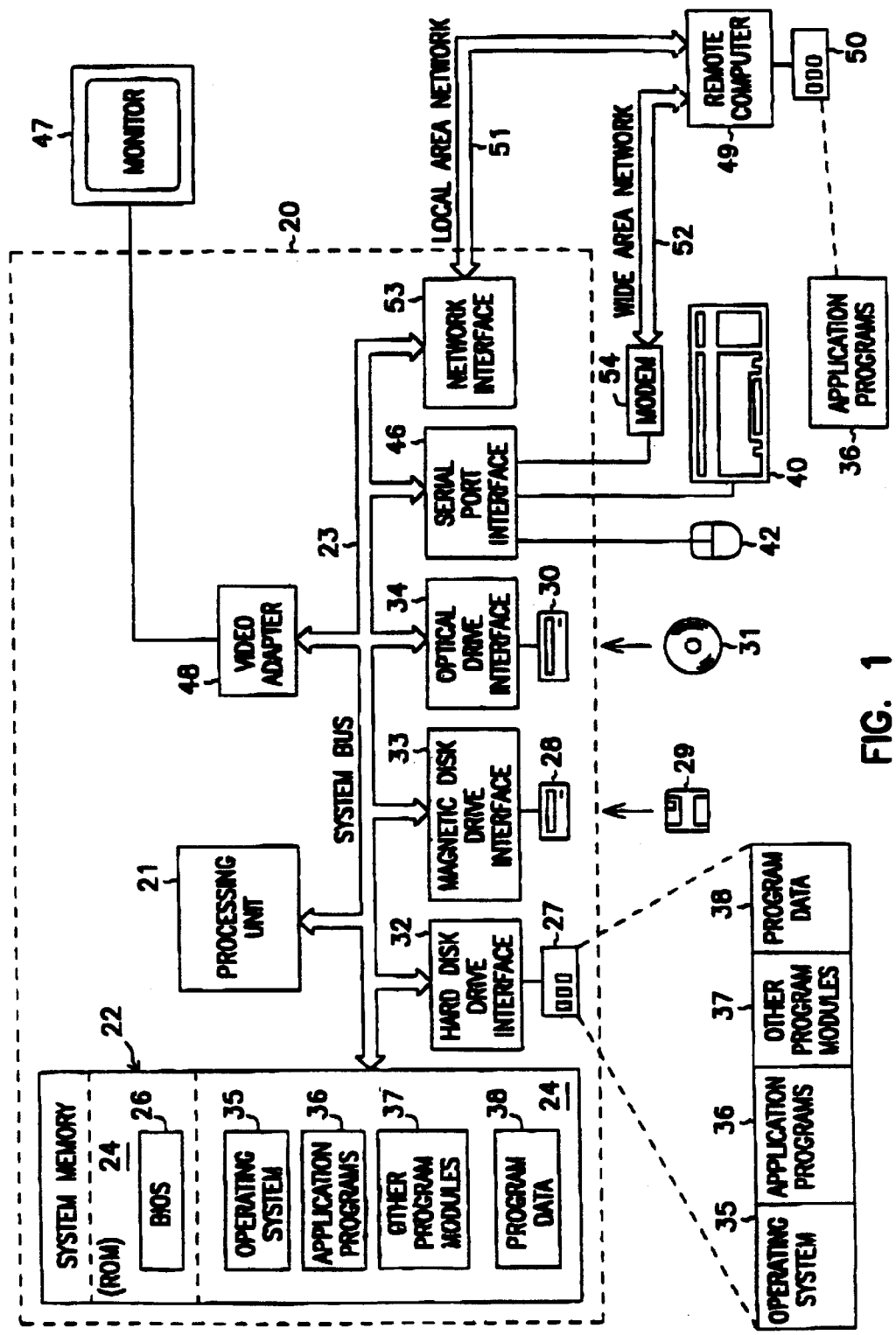
FIG. 1 shows a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components, including the system memory 22, to the processing unit 21. There may be only one or there may be more than one processing unit 21, sulch that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or mom remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple to other computers.

OVERVIEW

After a brief summary of object model terminology as used in the present application, an overview of the operation of an exemplary embodiment of the invention is described by reference to FIGS. 2 and 3.

In object models, a "class" defines the kind of characteristics, or properties, a particular type of object will possess. Each individual object in the model is frequently referred to as an "instance" of its class or an instance of an object of its class. For example, to create an organization chart, a programmer works with an "employee" class. One property of the employee class is color-coding, in this example, so that each level in the organization's hierarchy is visually differentiated. Another property of the employee class is job tide, such as vice-president, programmer, etc. All instances of employee objects contain the same data fields, such as name, social security number and salary rate, but each instance of an object has a unique state defined by the values of those data fields. For example, an instance of an employee class object with the job title property of "programmer" has a state defined as "Bob Smith", "123-00-4567" and "$75.00/hr. " while an instance of an employee class object with the job title property of "vice-president" has a state defined as "Joe Jones", "123-00-8900" and "$75,000/yr." The terms "object" and "instance of an object" are used interchangeably in the present application and the distinction will be clear to one skilled in the art based on the context in which the terms are used. A property which provides access to an object is often referred to as an accessor function.

In a hierarchical object model, the objects are arranged in a hierarchical fashion, with one object residing at the top level of the hierarchy and the remainder of the objects positioned at lower levels. Different instances of an object hierarchy can exist in the same runtime environment and are uniquely identified by The particular instance of the object at their top levels. Lower level objects in hierarchical object models can be connected to one or more higher objects in the hierarchy, referred to as "parent" objects. A unique instance of an object in the hierarchy can be identified as well-known in the art. Additionally, object classes can be confined to a single level in the hierarchy or can be located at any level depending on the architecture constrains of the model.

An object also contains "methods" or processes that the object performs on its data fields, usually in response to a message directed toward it. A "raise-salary" method for the employee object described previously causes the employee object to change the value of the salary rate data field when the employee is given a raise.

In addition to properties and methods, which are basically internal to an object, objects in an interactive run-time environment must react to outside actions such as when a user creates a new object by "dragging and dropping" an instance of an object into the hierarchy. This action causes the existing object that becomes the parent of the new object to broadcast a response to the action that notifies other objects that the child object has been created. The response is termed an "event" and the parent object is said to have "raised," "fired" or "sourced" a creation event in this case. Objects external to the particular object hierarchy can monitor the run-time environment ("listen") for creation events at various levels of the hierarchy to learn of new objects added to the object model. Thus in a corporate hierarchy model, a department object that is the parent of an employee object fires a creation event when a new employee is added to its department. A payroll program (a "listener" object) listens for the creation of a new employee object (a "target" object) so that it can request the values of the data fields in the new employee object that are necessary for a paycheck generation object.

Figure 2:
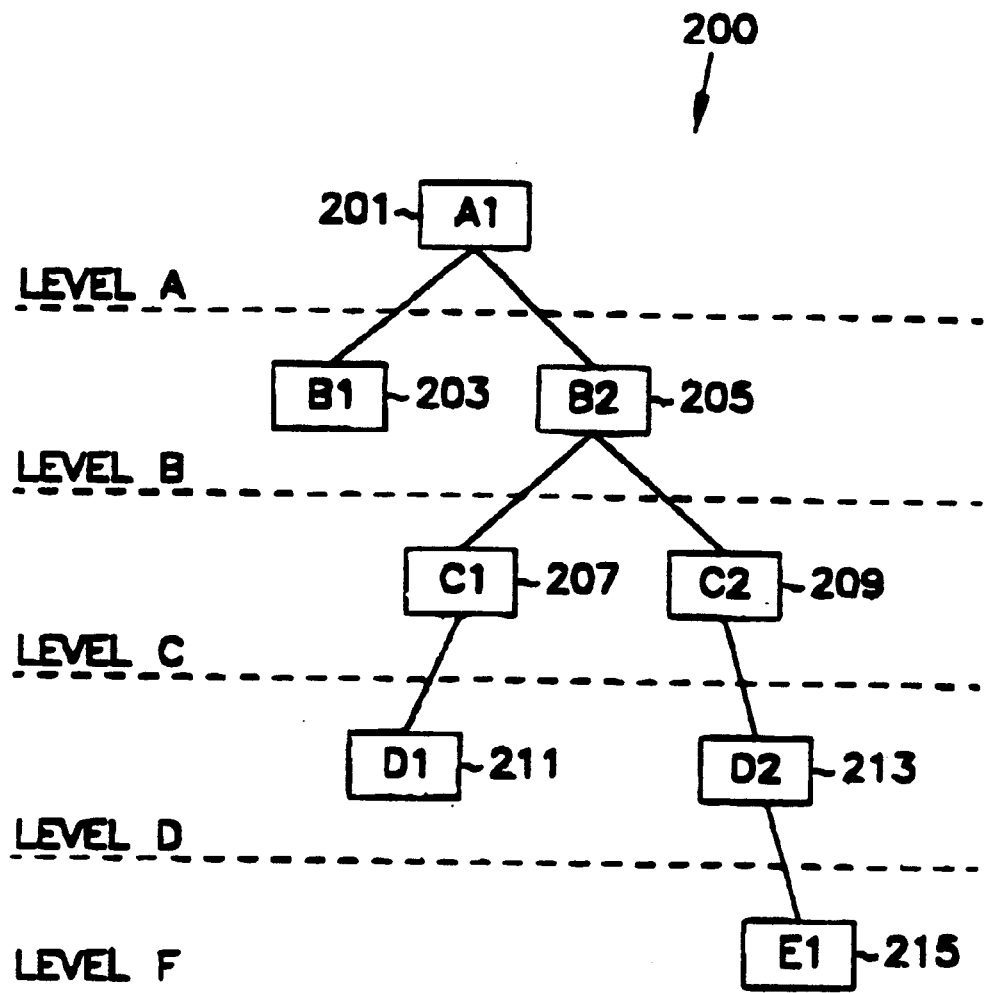
FIG. 2 is a diagram illustrating a system-level overview of a prior art hierarchical object model in a run-time environment.

FIG. 2 illustrates a prior an hierarchical object model having five levels, A–E. An A object 201 defines a particular object hierarchy 200. For the sake of clarity, the hierarchy 200 is a simplified object model in which each lower level object is connected to only one parent object at the immediate higher level Each object in FIG. 2 (and FIG. 3) is designated with a letter-number combination, such as B1 or C2, as well as with reference numbers, to facilitate the description of parameterized properties in the next section.

At the top level of the object hierarchy 200 in FIG. 2, the A object 201 is permanent while the run-time environment in which the object model 200 exists is active. B, C, D and E level objects are transient in that they are created and destroyed in the same run-time environment. In previous implementations of hierarchical object models, if an object outside the hierarchy, such as the payroll program object described above, needed to know when a transient object was created or destroyed, the listener object had to listen for creation and destruction events broadcast by the parent object of the target object. So, for example, when the listener object wanted to know of the creation of an instance of an E object in the hierarchical position occupied by the E object 215, it first listened to the A object 201 to determine when the B object 205 was created, then it listened to the B object 205 to determine when the C object 209 was created, then it listened to the C object 209 to determine when the D object 213 was created, and then it listened to the D object 213 to determine when the E object 215 was created. If any or all of the objects in the path to the E object 215 were destroyed, the listening object would have to begin the listening process again with the highest level object in the path which still existed.

Some prior art hierarchical object model employ an event bubbling scheme to simplify the programming of listening objects. In event bubbling, when the E object 215 is created, its parent D object 213 fires a creation event through a private connection to the C object 209 but may or may not broadcast the event The C object 209 then "re-fires" the creation event to the B object 205, which in turn re-fires the creation event to the A object 201. Because the A object 201 is at the top of the hierarchy, it broadcasts the creation event to notify all listening objects listening on the A object 201 that the E object 215 has been created. Thus, when a listener object wants to detect the creation, deletion, renaming, or other relevant events of an E object, it listens on the A object 201. However, all objects listening on the A object 201 receive the broadcast, even if they are not interested in E objects.

Figure 3:
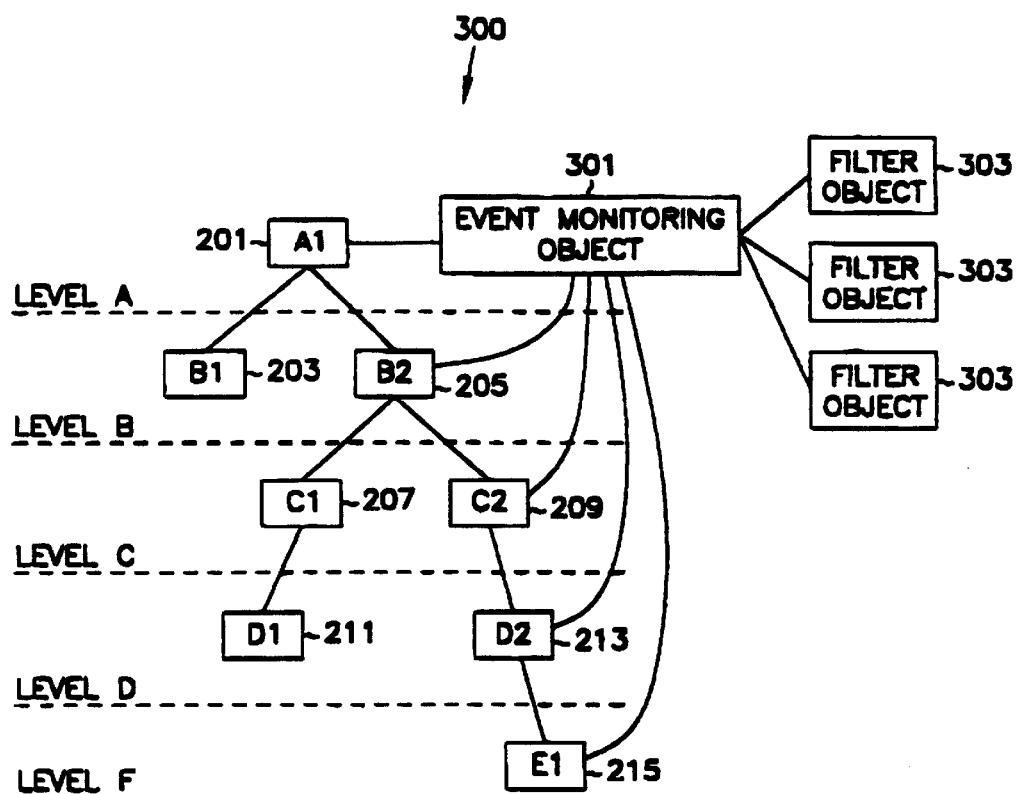
FIG. 3 is a diagram illustrating a system-level overview of an exemplary embodiment of the invention implemented in conjunction with the hierarchical object model shown in FIG. 2.

Consider, instead, one embodiment of a hierarchical object model of the present invention as illustrated in FIG. 3. The A object 201 uniquely defines a hierarchy 300. At the time the A object 201 is created in the run-time environment, an event monitoring object 301 is also created. As lower level objects are created in the hierarchy 300, they register with the event monitoring object 301 and route all their events to the event monitoring object 301 through a private port. Each registered hierarchical object class has a corresponding property in the event monitoring object 301. When a listening (listener) object registers its interest in events concerning a target instance of an object class, a notification request is initiated that specifies an identifier for the target instance as a parameter for the corresponding object class property, i.e., the property is "parameterized" with the identifier. The notification request can be initiated within the listening object itself, or can be initiated on behalf of the listening object by a process external to the listening object. By having the notification request initiated by the external process, the listener object itself can be a passive object rather than an active object having code that initiates the notification request.

The event monitoring object 301 creates an instance of a filter object 303 for the target instance if one does not already exist. Each instance of a filter object 303 is characterized by the parameterized property. The event monitoring object 303 passes only events concerning the target instance to the appropriate instance of filter object 303. The instance of filter object 303 then re-fires (sources) the events to the listening object(s) that requested the notification. The combination of the event monitoring object 301 and the instances of filtering object 303 serves as a centralized "switchboard" between events and listening objects.

The overview of the operation of an exemplary embodiment of the invention has been described in this section of the detailed description. An event monitoring object and a filter object have been described that reduce the overhead associated with tracking events in a hierarchical object model. While the invention is not limited to any particular hierarchical object model, for sake of clarity a simplified five-level hierarchy has been described.

METHODS OF AN EXEMPLARY EMBODIMENT OF THE INVENTION

In the previous section, an overview of the operation of an exemplary embodiment of the invention was described. In this section, the particular methods performed by the event monitoring object and the filter object(s) are described by reference to a state diagram. The methods constitute computer programs made up of computer-executable instructions which can be performed by clients or servers. Describing the methods by reference to a state diagram enables one skilled in the art to develop such programs including such instructions to carry out the methods on suitable computerized clients or servers (the processor of the clients or servers executing the instructions from computer-readable media). The methods described in this section can equated directly to methods of the hierarchical objects themselves or can be computer-executable instructions performed by other objects in the run-time environment.

Figure 4:
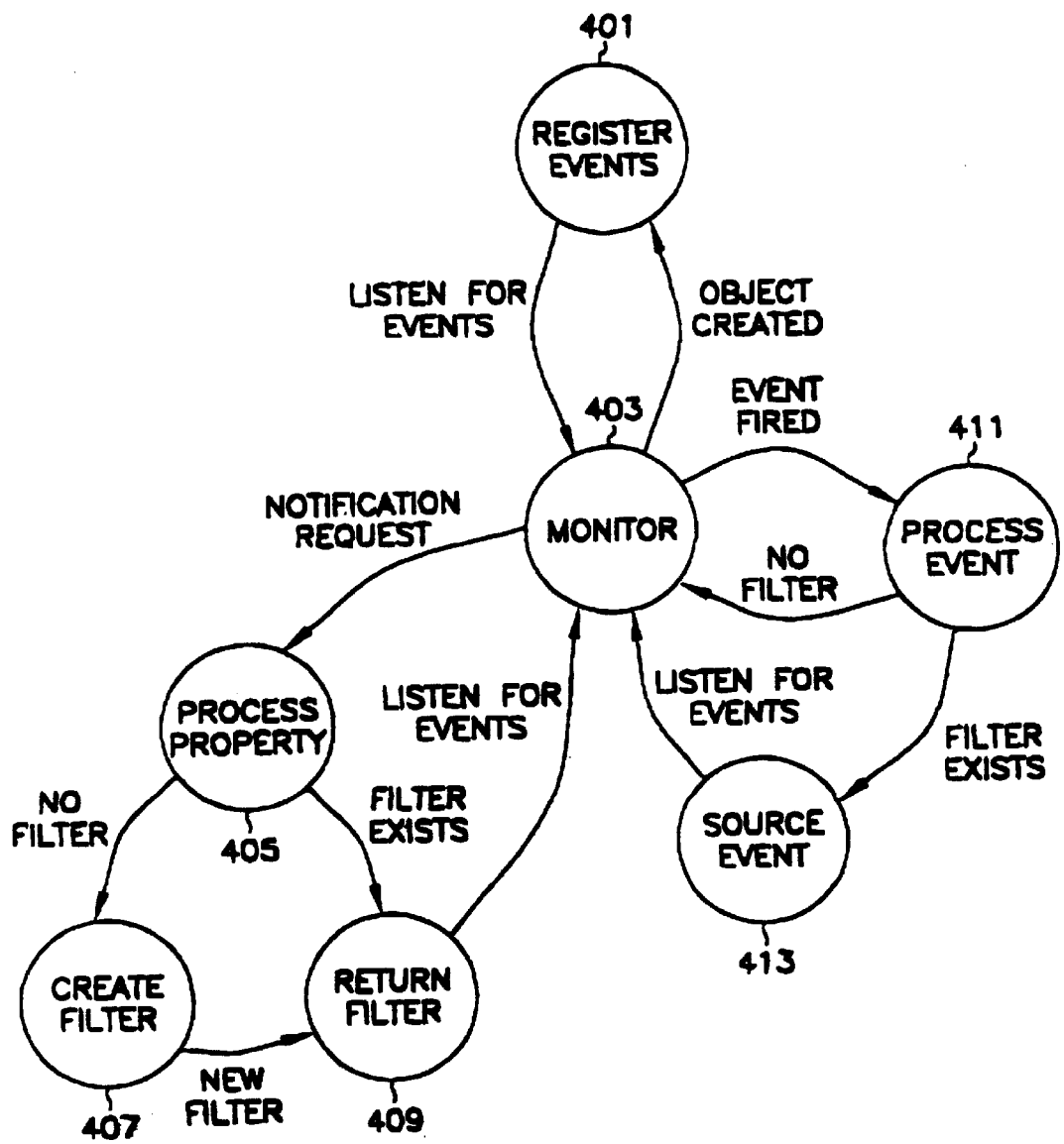
FIG. 4 is a state diagram of a method to be performed in an exemplary implementation of the invention.

Referring first to FIG. 4, a stare diagram of a series of methods to be performed according to an exemplary embodiment of the invention is shown. These methods are inclusive, of the steps or acts required to be taken by the event monitoring object and the filter object(s). References to the objects shown in FIG. 3 are used throughout this section.

When the event monitoring object 301 is created, it first registers events for the A object 201 in the object hierarchy 300 (state 401). The event monitoring object 301 then listens for events from the A object 201 (state 403). As new objects are created in the hierarchy 300, they register with the event monitoring object 301. In one embodiment, the hierarchical objects fire all their events to the event monitoring object 301. Alternate embodiments in which only a subset of the hierarchical objects register with the event monitoring object 301 or in which only a subset of all events are fired to the event monitoring object 301 are equally applicable to the present invention. In still another embodiment, the event monitoring object is logically coupled to a lower level object in the hierarchy so that only the events pertaining to objects in the hierarchy below the lower level object are fired to the event monitoring object.

A listener object that wants to receive notification of events pertaining to an object registers its interest in those events with the event monitoring object 301 by parameterizing the property corresponding to the object's class using the appropriate object identifier for the property's parameter. In this example, the identifier is based on the object's level in the hierarchy so that all objects of the class occupying that hierarchical position are designated. When the identifier for a unique object is used as the parameter, the parameterized property will designate events pertaining only to that particular object. Alternately, the parameter can be an identifier for a class so that events pertaining to all instances of the object class, regardless of their level in the hierarchy, are designated.

A listener object interested in E objects that occupy the hierarchical position of the E object 215 shown in FIG. 3 therefore wants to be notified of events pertaining to E objects that are fired by the D object 213, the immediate parent of the E object 215. The exemplary property in the event monitoring object 301 that corresponds to events pertaining to E objects is EEvents(b,c,d), where "b,c,d" is a placeholder for the identifier parameter. Therefore, the parameterized property EEvents(B2, C2, D2) designates events concerning an instance of an E object that occupies a position in the hierarchy having the D object 213, the C object 209 and the B object 205 as parent objects. The instance of the filter object 303 created to source these requested events is the EEvents(B2, C2, D2) filter object. The designation of the A object 201 is unnecessary since the event monitoring object 301 is logically coupled to the A1 instance of the A object.

A notification request for a listener object interested in all events concerning D objects occupying the hierarchical positions of the D objects 211 and 213 would specify the parameterized property DEvents(B2, NULL). The NULL value in the "c" location in the placeholder designates that no filtering is performed at the C level and therefore, events from both the C object 207 and the C object 209 are sourced to the interested listening object by the DEvents(B2, NULL) filter object.

The event monitoring object 301 processes the parameterized property (state 405) and determines if a filter object 303 already exists to source the same events. If the filter object exists, the event monitoring object 301 returns ("hooks") the appropriate filter object 303 to the listener object (state 409). The existing filter object 303 thus becomes the source of the event(s) for the newly registering listener object as well as any listener objects which have previously registered their interest in the events. If the filter object does not exist, the event monitoring object 301 creates a new filter object (state 407) and returns the new filter object 303 to the listener object (state 409).

When an event is routed by an object in the hierarchy 300 to the event monitoring object 301, the event monitoring object 301 processes the event by determining if a corresponding filter object exists. If no filter object 303 exists, no listener object has registered for notification of the event and the event monitoring object 301 discards the event. If a filter object does exist, the event monitoring object passes the event to the appropriate filter object 303 which then sources the event to the interested listener object(s).

In one embodiment, the event monitoring object 301 does not destroy a filter object 303 when the listener object or the object that fires the event terminates. Therefore, the filter object 303 can be reused when another instance of the hierarchical object is created or a different listener object registers its interest in events concerning the object. As will be apparent to one skilled in the art, alternate embodiments in which the filter object 303 is destroyed when the listener object or the hierarchical object are destroyed are equally applicable and are considered within the scope of the invention. Furthermore, alternate embodiments in which certain pre-determined filter objects 303 are created at the time the event monitoring object 301 is created are also within the scope of the invention.

The event monitoring object 301 continues cycling through its defined states as long as the hierarchy 300 is loaded into the run-time environment space of the client or server. As will be readily apparent to one skilled in the art, the event monitoring object 301 is reentrant and thus handles additional events which may cascade as a result of processing an event.

The particular methods performed by an event monitoring object and a filter object of an exemplary embodiment of the invention have been described. The method performed by the event monitoring object and the filter object has been shown by reference to a state diagram.

VISUAL BASIC IMPLEMENTATION

In this section of the detailed description, a particular implementation of the invention in a Visual Basic programming environment is described. Visual event-driven object-oriented languages, such as Visual Basic, are uniquely suited to interactive applications operating within a windowing environment, such as Microsoft Windows 95 or Windows NT. The Microsoft Visual Basic environment (VBE) provides a hierarchical object model to the programmer consisting of a "Project" object class, a "Form" object class, and a "Control" object class. A specific instance of a Project object is created to define a particular application. Instances of Form objects create the windows displayed to the user.

Instances of Control objects reside on the Form objects to present data to the user and provide the user with a mechanism to send events to the application. Examples of Control objects are buttons, menus, and text entry boxes.

The programmer defines the values of the properties of each instance of an object and writes code to define the methods of the objects. When the application is executed, the user is presented with a Form object containing Control object(s) on which the user can "click" a pointing device, such as a mouse, to direct the application to take a certain action, such as invoking another Form object or inputting data. The user's action cause the execution of a corresponding method for the object to which the action is directed and results in events being fired by that object.

Figure 5:
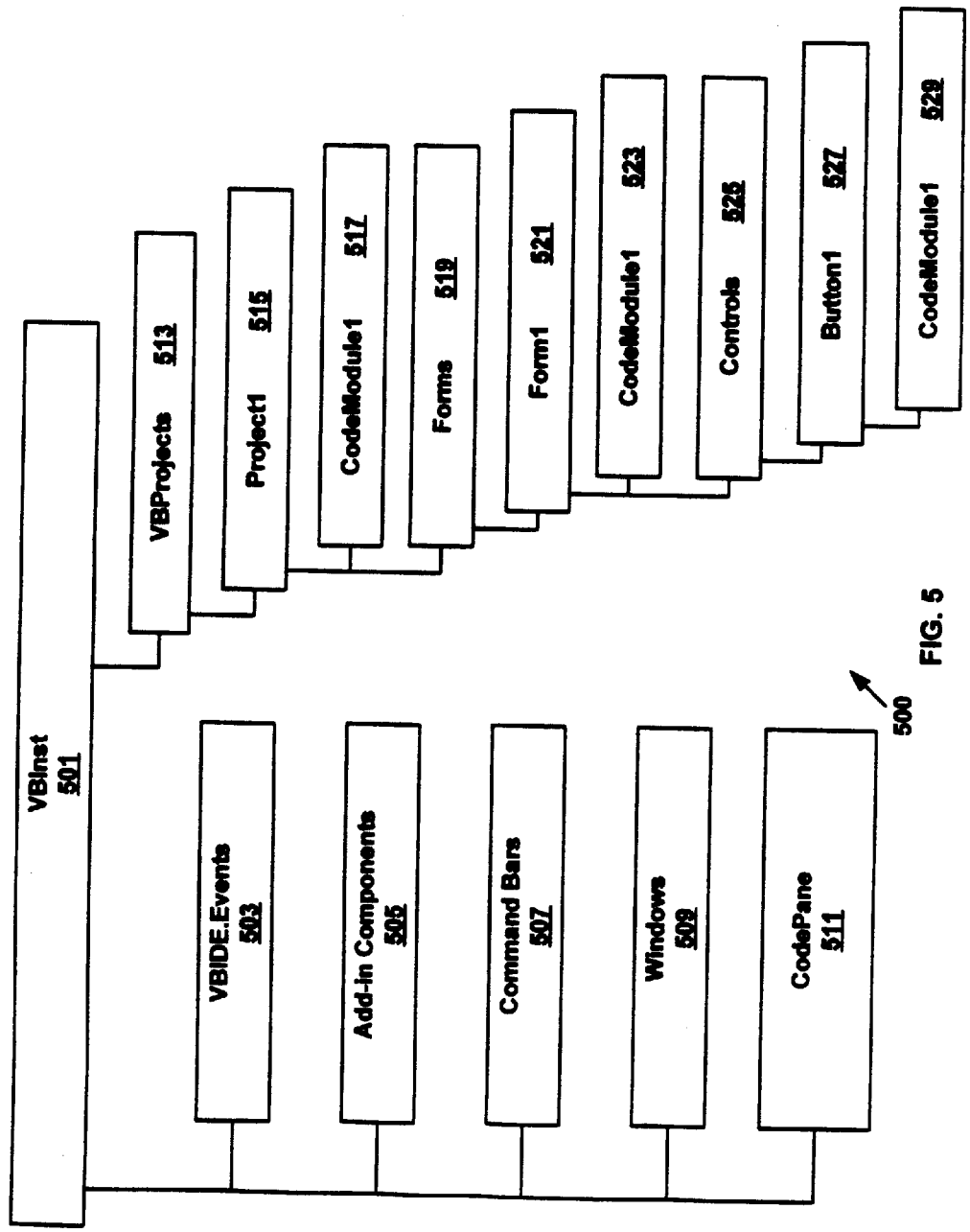
FIG. 5 is a diagram illustrating an instance of a Visual Basic Integrated Development Environment hierarchical object model.

The Microsoft VBE provides the programmer with a collection of objects known as the Visual Basic Integrated Development Environment (VBIDE), one embodiment of which is illustrated as VBIDE 500 in FIG. 5. Each invocation of the VBIDE 500 by a programmer creates a VBInstance object 501 which acts as the top level object of the VBIDE. The VBIDE comprises CommandBar objects 507, such as a menu bar or context menus, Window objects 509, such as a project explorer window or a tool window, and CodePane objects 511 which assist the programmer in creating code for the application. Other objects are created in the VBIDE hierarchical object model shown in FIG. 5 which enable the programmer to obtain information about the Project, Form and Control objects being used to design an application.

Furthermore, the VBIDE allows a programmer to create "add-in" components 505 to tailor the generic VBE to particular needs. Add-in components 505 perform rote design tasks, enforce design standards on a programming effort, generate a basic hierarchical object model or provide similar macro-like capabilities within the VBIDE 500 itself. Add-in components which guide a programmer through complicated tasks by asking a series of questions are often referred to as "wizards."

Using the current invention, the VBE provides an event monitoring object VBIDE. Events 503 that receives notification of all events that occur in the VBIDE 500. The VBIDE.Events object 503 is logically coupled to the VBInstance object 501 and supplies methods that allow the author of an add-in component 505 to respond to events that occur in the VBIDE 500. The events occur when, as an example, a programmer selects a Project object, such as Project1 515, or adds a Control object to a Form object, such as Button1 527 for Form1 521. The add-in component 505 uses the properties of the VBIDE.Events object 503 to listen for changes in the VBIDE 500 in which the add-in 505 is interested. The VBIDE.Events object 503 returns filter objects of the same type as the property name to the add-in component 505.

In one embodiment of the VBE, the VBIDE.Events object 503 has CommandBarEvents, FileControlEvents, ReferencesEvents, SelectedVBControlsEvents, VBComponentsEvents, VBControlsEvents and VBProjectsEvents properties which correspond to events pertaining the class of object indicated by the name of the property. The VBIDE.Events object 503 creates filter objects to source the events for a specific instance of an object class as characterized by parameterizing the corresponding property with the identifier for the instance. A parameterized property specified in a notification request for a listener object, such as an add-in component, is used by the VBIDE.Events object 503 to register the listener object's interest in the events designated by parameterized property. The appropriate filter object to source the events is created by the VBIDE.Events object 503 if it does not already exist.

For example, a CommandBarEvents filter object returns events that occur to CommandBar objects 507, such as when a command bar control is clicked by a programmer working in the VBIDE 500. In the embodiment being described, an add-in object 505 gains access to a CommandBarEvents filter object by first defining the CommandBarEvents public variable using a Visual Basic WithEvents keyword and then specifying the filter object through the use of the property in a Visual Basic Set statement as illustrated in the following Visual Basic code segment. The commands used below are documented in the *Microsoft Visual Basic 5.0 Progammer's Guide* and the *Microsoft Visual Basic 5.0 Language Reference*, both available from Microsoft Press. Comments are indented and preceded by a single quote mark.

'command bar event handler—in the declaration section of the class module 'Class1'
Public WithEvents MenuHandler As CommandBarEvents
  this event fires when the menu is clicked in the IDE—defined in the class module 'Class1'
Private Sub MenuHandler_Click(ByVal CommandBarControl As Object, handled As Boolean, CancelDefault As Boolean)
  some user code
End Sub
  'Set the event handler to sink the events—in some initialization code. Set Class1.MenuHandler= VBInst.Events.CommandBarEvents (MenuCommandBarControl)
  Where MenuCommandBarControl is the control of interest.'
MenuCommandBarControl is defined as
Dim mcbMenuCommandBar As Office.CommandBarControl Each filter object sources certain events pertaining to an instance of the object that is defined by parameters specified as part of the corresponding VBIDE.Events property. For example, a VBControlsEvents filter object sources ItemAdded, ItemRemoved and ItemRenamed events when a Control object in a target Form object, such as Button1 527 in Form1 521, is added, removed, or renamed. The target Form object is defined by the parameters VBProject and VBForm in the VBControlsEvents filter object. Combined, the parameters specify an instance of the Form object based on a unique object instance handle. The interested add-in object 505 requests the events be sourced to it using the VBControlsEvents parameterized property, i.e., VBControlsEvents(Project1, Form1), in the Set statement. The VBIDE.Events object 503 creates a VBControlsEvents (Project1, Form1) filter object, "hooks" it to the add-in object 505, and sources all ItemAdded, ItemRemoved and ItemRenamed events fired in the object hierarchy when a Control object is added, removed or renamed in the target Form object 521. Specifying a null value for the VBProject and VBForm parameters in the VBCONTROLSEVENTS property returns events pertaining to Control objects in all Form objects in all Project objects active in the VBIDE 500 to the add-in object, i.e., no filtering is performed by the VBCONTROLSEVENTS filter object.

A particular embodiment of event monitor and filter objects in a hierarchical object model provided by the Visual Basic Interactive Development Environment have been described. The invention as described in this section is not limited to use in the VBIDE but is applicable to all program

Conclusion

A method of centralized monitoring and sourcing of events fired within a hierarchical object model has been described. The method creates a monitoring object to which the events in the hierarchy are routed. The monitoring object has a plurality of properties, each of which corresponds to the events concerning a class of objects in the hierarchy. A filter object is created and coupled to the monitoring object to source events pertaining to an instance of an object class as defined by parameterizing the corresponding object class property with an identifier for the instance. A listener object is logically coupled to the filter object based on the parameterized property in a notification request that registers the listener object's interest in the events sourced by the filter object. Events corresponding to the parameterized property are transmitted from the monitoring object to the filter object for sourcing to the listener object. The method couples all listener objects interested in the same events to the same event filter.

Although specific embodiments have been illustrated and described herein, it will be appreciated by those of ordinary skill in the art that any arrangement which is calculated to achieve the same purpose may be substituted for the specific embodiments shown his application is intended to cover any adaptations or variations of the present invention.

The terminology used in this application with respect to the Microsoft Visual Basic environment and the Visual Basic Integrated Development Environment is meant to include all object-oriented programming environments which incorporate a hierarchical object model. Therefore, it is manifestly intended that this invention be limited only by the following claims and equivalents thereof.

We claim:

1. A computerized method for centralized receiving and sourcing of events occurring in a hierarchical object model comprising:

creating a monitoring object logically coupled to an object in the model, the monitoring object having a plurality of properties, each property corresponding to events pertaining to an object class in the hierarchy and having a parameter for designating an object in the class;

routing events occurring in the hierarchy to the monitoring object;

receiving a first notification request in which the property corresponding to the class of a target object has been parameterized with an identifier, wherein the identifier specifies one of:
  a class of objects, wherein notification of an event associated with a specific class of objects in the hierarchy is requested,
  a level in die hierarchy of objects, wherein notification of an event associated with a specific hierarchy chain is requested, and
  a class of objects and a level in the hierarchy of objects, wherein notification of an event associated with a specific class of objects in the hierarchy and with a specific level in the hierarchy is requested;

creating a filter object characterized by the parameterized property when a filter object so characterized does not exist;

logically coupling the filter object characterized by the parameterized property between the monitoring object and a first listener object; and transmitting, from the monitoring object to the filter object, those events pertaining to the target object designated by the parameterized property for sourcing to the first listener object.

2. The computerized method of claim 1, wherein first listener object causes the notification request to be initiated.

3. The computerized method of claim 1, wherein a process causes the notification request to be initiated on behalf of the first listener object.

4. The computerized method of claim 1, further comprising:

comparing a parameterized property in a second notification request with the parameterized property characterizing each existing filter object; and if the parameterized properties match,
  logically coupling the filter object characterized by the parameterized properties, between the monitoring object and a second listener object, and
  transmitting, from the monitoring object to the filter object characterized by the
  parameterized properties, events pertaining to the target object designated by the
  parameterized properties for sourcing to the listener objects coupled to the filter object.

5. The computerized method of claim 4, further comprising:

if the parameterized property in the second notification request does not match any of the parameterized properties characterizing existing filter objects, creating a filter object characterized by the parameterized property in the second notification request, logically coupling the filter object characterized by the parameterized property in the second notification request between the monitoring object and the second listener object, and transmitting, from the monitoring object to the filter object characterized by the parameterized property in the second notification request, events pertaining to the target object designated by the parameterized property in the second notification request for sourcing to the second listener object.

6. The computerized method of claim 1, further comprising discarding events routed to the monitoring object that do not correspond to any of the parameterized properties characterizing existing filter objects.

7. The computerized method of claim 1, wherein a filter object is not destroyed when all listener objects coupled to it terminate.

8. A computer-readable medium having stored thereon a hierarchical object model for use in an object-oriented program comprising:

an event monitoring object logically coupled to an object in the model and functioning as a routing destination for a plurality of events during execution of the program;

a plurality of program objects logically coupled together in a hierarchical relationship, wherein each event that occurs during execution of the program is fired by one of the program objects;

a plurality of event filter objects logically coupled to the event monitoring object, wherein each filter object is created by the event monitoring object to source events pertaining to an instance of a program object; and a listener object logically coupled to a particular one of the event filter objects based on a notification request received by the event monitoring object from the listener object, where the notification request designates one of:
- a class of objects, wherein notification of an event associated with a specific class of objects in a hierarchy is requested,
- a level in the hierarchy of objects, wherein notification of an event associated with a specific hierarchy chain is requested, and
- a class of objects and a level in the hierarchy of objects, wherein notification of an event associated with a specific class of objects in the hierarchy and with a specific level in the hierarchy is requested.

9. The computer-readable medium of claim 8, wherein:
the event monitoring object has a plurality of properties, each property corresponding to events pertaining to a program object and having a parameter for designating an instance of the program object; and
the notification request is initiated by using one of the plurality of properties which has been parameterized by an identifier to designate the instance of the program object, the event filter being characterized by the parameterized property so that the parameterized property is used to determine the particular one of the event filter objects to couple to the listener object.

10. The computer-readable medium of claim 9, wherein the particular event filter object is created when the identifier in the notification request results in a parameterized property that does not characterize an existing event filter.

11. The computer-readable medium of claim 8, wherein the program objects are grouped according to object class and hierarchical level.

12. The computer-readable medium of claim 8, wherein the program objects are grouped according to object class.

13. The computer-readable medium of claim 8, wherein an instance of the program object is unique.

14. The computer-readable medium of claim 8, wherein the event monitoring object creates an event filter object without receiving a notification request.

15. A computer system comprising;
a processing unit;
a system memory coupled to the processing unit through a system bus;
a computer-readable medium coupled to the processing unit through a system bus;
an event sourcing and filtering program executed from the computer-readable medium by the processing unit, wherein the event sourcing and filtering program causes the processing unit to create:
an event monitoring object for receiving events fired by objects in a hierarchical object model in system memory; and
wherein the event monitoring object creates an event filter object for sourcing, to a listener object executing in the processing unit, events pertaining to a target object designated by a parameterized property specified by the listener object, wherein the parameter specifies one of:
- a class of objects, wherein notification of an event associated with a specific class of objects in the hierarchy is requested,
- a level in the hierarchy of objects, wherein notification of an event associated with a specific hierarchy chain is requested, and
- a class of objects and a level in the hierarchy of objects, wherein notification of an event associated with a specific class of objects in the hierarchy and with a specific level in the hierarchy is requested.

16. The computer system of claim 15, wherein the event sourcing and filtering program causes the processing unit to assign, to the event monitoring object, a plurality of properties corresponding to events pertaining to an object class in the hierarchy with each property having a parameter used to designate an instance of the object class.

17. The computer system of claim 16, wherein:
a notification request is initiated by using one of the plurality of properties which has been parameterized by an identifier to designate the instance of the program object, and
the notification request instructs the event sourcing and filtering program to cause the processing unit to create an event filter object characterized by the parameterized property if one does not exist.

18. The computer system of claim 17, wherein the identifier designates the instance based on the level the instance occupies in the hierarchy.

19. The computer system of claim 17, wherein the identifier designates a unique instance.

20. A method for reducing overhead in event processing by enabling a listener object to specify objects of interest to the listener object, and routing only events of interest to the listener object, the method comprising:
creating a monitoring object logically coupled to an object in a hierarchy of objects via a private port, wherein the monitoring object receives notification or events and wherein the monitoring object has a plurality of properties, each property corresponding to evens pertaining to an object class and having a parameter for identifying a particular object in the class;
creating a listener object wherein the listener object specifies the events in which the listener object is interested by initiating a notification request, wherein the notification request identifies one of the following:
- a class of objects, wherein notification of an event associated with a specific class of objects in the hierarchy is requested,
- a level in the hierarchy of objects, wherein notification of an event associated with a specific hierarchy chain is requested, and
- a class of objects and a level in the hierarchy of objects, wherein notification of an event associated with a specific class of objects in the hierarchy and with a specific level in the hierarchy is requested;
creating a filter object characterized by the notification request, wherein the filter object is logically coupled between the monitoring object and the listener object, and wherein the filter object routes events characterized by the notification request from the monitoring object to the listener object.

21. The method of claim 20, further comprising:
receiving an event at the monitoring object from an object in the hierarchy of objects at the monitoring object;
determining if the event is of interest to the listener object;
transmitting the event to the listener object if the event is of interest to the listener object and not transmitting the event if the event is not of interest to the listener object.

22. The method of claim 21, wherein transmitting the event to the listener object further comprises routing the event of interest to the listener object to the filter object characterized by the identified property and the identified one of the following:
- a class of objects, wherein notification of an event associated with a specific class of objects in the hierarchy is requested, a level in the hierarchy of objects, wherein notification of an event associated with a specific hierarchy chain is requested, and a class of objects and a level in the hierarchy of objects, wherein notification of an event associated with a specific class of objects in the hierarchy and with a specific level in the hierarchy is requested.

23. A method for reducing the amount of overhead associated with event notification, the method comprising:

receiving notification of an event at a first object in a hierarchy of objects;

receiving notification of at least one of a plurality of events of interest to a second object, wherein the notification identifies one of the following:
- a class of objects, wherein notification of an event associated with a specific class of objects in the hierarchy is requested,
- a level in the hierarchy of objects, wherein notification of an event associated with a specific hierarchy chain is requested, and
- a class of objects and a level in the hierarchy of objects, wherein notification of an event associated with a specific class of objects in the hierarchy and with a specific level in the hierarchy is requested;

determining if the event at the first object is of interest to the second object; and notifying the second object of the event only if the event is of interest to the second object.

24. The method of claim 23, wherein the notification of at least one of a plurality of events of interest to a second object further comprises:

specifying a property corresponding to events concerning the class of a target object and identifying at least one of an object, a class and a level in the hierarchy.

25. The method of claim 23, further comprising:

creating a third object characterized by the specified property and the identified one of the following:
- a class of objects, wherein notification of an event associated with a specific class of objects in the hierarchy is requested,
- a level in the hierarchy of objects, wherein notification of an event associated with a specific hierarchy chain is requested, and
- a class of objects and a level in the hierarchy of objects, wherein notification of an event associated with a specific class of objects in the hierarchy and with a specific level in the hierarchy is requested for routing the event to the second object.

26. The method of claim 23, wherein notifying the second object of the event only if the event is of interest to the second object further comprises:

routing the notification of the event at the first object to the third object.

27. The method of claim 23, wherein determining if the event at the first object is of interest to the second object further comprises:

determining if the event at the first object is an event characterized by the specified property and the identified one of the following:
- a class of objects, wherein notification of an event associated with a specific class of objects in the hierarchy is requested,
- a level in the hierarchy of objects, wherein notification of an event associated with a specific hierarchy chain is requested, and
- a class of objects and a level in the hierarchy of objects, wherein notification of an event associated with a specific class of objects in the hierarchy and with a specific level in the hierarchy is requested.

28. A method for reducing the amount of overhead associated with tracking a transient object, the method comprising:

detecting one of a list of events related to a first object in a hierarchy, the list comprising:
- creating the first object in a hierarchy,
- changing the first object in a hierarchy, and
- removing the first object from a hierarchy;

sending a notification from the first object to a monitoring object;

receiving a notification from a second object of events in which the second object is interested, identifying one of:
- a class of objects, wherein notification of an event associated with a specific class of objects in tie hierarchy is requested,
- a level in the hierarchy of objects, wherein notification of an event associated with a specific hierarchy chain is requested,
- a class of objects and a level in the hierarchy of objects, wherein notification of an event associated with a specific class of objects in the hierarchy and with a specific level in the hierarchy is requested;

determining if the event related to the first object is of interest to the second object; and notifying the second object of the event related to the first object if the event is of interest to the second object.

29. The method of claim 28, wherein said notification from the first object to a monitoring object is transmitted via a private port.

* * * * *

UNITED STATES PATENT AND TRADEMARK OFFICE
CERTIFICATE OF CORRECTION

PATENT NO. : 6,363,435 B1
DATED : March 26, 2002
INVENTOR(S) : Joseph P. Fernando and John M. Norwood It is certified that error appears in the above-identified patent and that said Letters Patent is hereby corrected as shown below:

Column 1,
Line 28, after "messages", insert a period (-- . --).

Column 2,
Line 34, after "fication", insert a period (-- . --).
Line 44, delete "object, cause" and insert therefor -- objects, causing --.

Column 3,
Line 7, delete """ before "Alternatively".
Line 9, delete """ after "request."

Column 4,
Line 22, delete "dead" and insert therefor -- detailed --.
Line 28, after "provided", insert a period (-- . --).
Line 66, delete "sulch" and insert therefor -- such --.

Column 5,
Line 41, after "joystick", insert a comma (-- , --).

Column 6,
Line 44, delete "tide" and insert therefor -- title --.
Line 65, delete "The" and insert therefor -- the --.

Column 7,
Line 38, after "level", insert a period (-- . --).

Column 8,
Line 4, after "even", insert a period (-- . --).

Column 9,
Line 9, delete "stare" and insert therefor -- state --.
Line 12, after "inclusive", delete the comma (",").

Column 12,
Line 21, before "this", insert a single quotation mark (-- ` --).
Line 26, before "some", insert a single quotation mark (-- ` --).
Line 29, "Set" should begin a new paragraph.
Line 32, before "Where", insert a single quotation mark (-- ' --).
Line 34, before "Menu", insert a single quotation mark (-- ` --).

UNITED STATES PATENT AND TRADEMARK OFFICE
CERTIFICATE OF CORRECTION

PATENT NO.   : 6,363,435 B1
DATED        : March 26, 2002
INVENTOR(S)  : Joseph P. Fernando and John M. Norwood It is certified that error appears in the above-identified patent and that said Letters Patent is hereby corrected as shown below:

Column 13,
Line 27, delete "shown his" and insert therefor -- shown. This --.

Column 16,
Line 27, delete "or" and insert therefor -- of --.

Signed and Sealed this

Twenty-third Day of July, 2002

*Attest:*

*Attesting Officer*

JAMES E. ROGAN
*Director of the United States Patent and Trademark Office*